United States Patent
Khdary et al.

(10) Patent No.: US 10,450,441 B2
(45) Date of Patent: Oct. 22, 2019

(54) SOLID STATE DYE LASER AND METHODS FOR PREPARING THE SAME

(71) Applicant: KING ABDULAZIZ CITY SCIENCE & TECHNOLOGY (KACST), Riyadh (SA)

(72) Inventors: Nezar Hassan Khdary, Riyadh (SA); Mamdouh E Abdelsalam, Adelaide (AU)

(73) Assignee: The King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 14/872,182

(22) Filed: Oct. 1, 2015

(65) Prior Publication Data

US 2017/0096545 A1    Apr. 6, 2017

(51) Int. Cl.
*H01S 3/16* (2006.01)
*C08K 3/36* (2006.01)
*C08K 5/29* (2006.01)

(52) U.S. Cl.
CPC ............. *C08K 5/29* (2013.01); *H01S 3/168* (2013.01)

(58) Field of Classification Search
CPC .......... H01S 3/168; C08K 3/36; C08K 5/5415
See application file for complete search history.

(56) References Cited

U.S. PATENT DOCUMENTS 5,222,092 A * 6/1993 Hench ............... H01S 3/168
                                              372/53
2009/0099282 A1 * 4/2009 Muller ............ C09B 67/0097
                                              524/100

OTHER PUBLICATIONS

Duarte et al., "Tunable solid-state lasers incorporating dye-doped, polymer-nanoparticle gain media," Optics Letters, vol. 28, No. 21, Nov. 1, 2003. pp. 2088-2090. (Year: 2003).*

* cited by examiner

*Primary Examiner* — Kara B Boyle
(74) *Attorney, Agent, or Firm* — Steven M. Shape; Dennemeyer & Associates, LLC (57) ABSTRACT

The invention provides a solid state dye laser and methods for preparing the solid state dye laser. The solid state dye laser includes a porous copolymer membrane of poly(vinylidenefluoride-cohexafluoroproplyne) (PVDF-HFP) and a laser dye. The laser dye is incorporated in pores of the copolymer membrane. The solid state dye laser is prepared using one of a phase inversion technique, a phase separation technique, and a breath figure technique.

10 Claims, 5 Drawing Sheets

SOLID STATE DYE LASER AND METHODS FOR PREPARING THE SAME

FIELD OF THE INVENTION

The invention generally relates to laser dyes. More specifically, the invention relates to a solid state dye laser and methods of preparing the solid state dye laser.

BACKGROUND OF THE INVENTION

Generally, most dye lasers contain organic molecules dyes which are used in liquid form as solutions in the dye lasers. Such liquid laser dyes are coherent source of radiation with a wide tuning range and are used for many applications in various fields such as an ocular photo-dynamic and a photo-coagulation therapy. However, liquid laser dyes cannot be used in certain applications due to the inconvenience in handling of hazardous organic solvents. The solid matrix laser dyes are an attractive alternative to the conventional liquid laser dyes. The solid matrix laser dyes such as solid-state polymer laser dyes are gaining importance with the development of new matrices and additive materials. However, the photo-stability of the solid-state polymer laser dyes is lower which restricts the use of the solid-state polymer laser dyes in certain fields of applications.

Thus, there is a need to develop an improved method for preparing solid-state polymer dye lasers.

BRIEF DESCRIPTION OF THE FIGURE

The accompanying figures together with the detailed description below forms part of the specification and serves to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily for a solid state dye laser and methods of preparing the solid state dye laser.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a solid state dye laser and methods for preparing the solid state dye laser. The solid state dye laser includes a porous copolymer membrane of poly(vinylidenefloride-cohexafluoroproplyne) [PVDF-HFP] and a laser dye. The laser dye is incorporated in pores of the copolymer membrane. The laser dye is one of Rhodamine dye and Coumarin dye. The solid state dye laser is prepared using one of, but not limited to, a phase inversion technique, a phase separation technique, and a breath figure technique. Rhodamine dye in the solid state dye laser is one of, but not limited to, Rhodamine B, Rhodamine 101, Rhodamine 6G, Rhodamine 110 and Rhodamine 19. Coumarin dye in the solid state dye laser is one of, but not limited to, Coumarin 466, Coumarin 47, Coumarin 102, Coumarin 152A, Coumarin 152, Coumarin 151, Coumarin 6H, Coumarin 307, and Coumarin 500.

A method of preparing a solid state dye laser using a phase inversion technique includes forming porous copolymer membrane of poly(vinylidenefloride-cohexafluoroproplyne) [PVDF-HFP] and thereafter, loading the porous copolymer membrane with a laser dye. The loading is carried out by soaking the porous copolymer membrane in an alcoholic solution of the laser dye.

Another method of preparing the solid state dye laser using a phase separation technique includes immobilizing a laser dye on surface of silica ($SiO_2$) nano particles Subsequently, porous copolymer membranes is prepared using a solution containing PVDF-HFP, the $SiO_2$ nanoparticles modified with the laser dye, acetone and water.

Another method of preparing the solid state dye laser using a breath figure technique includes carrying out the procedures of a phase inversion technique or a phase separation technique in a humid chamber.

Figure 1:
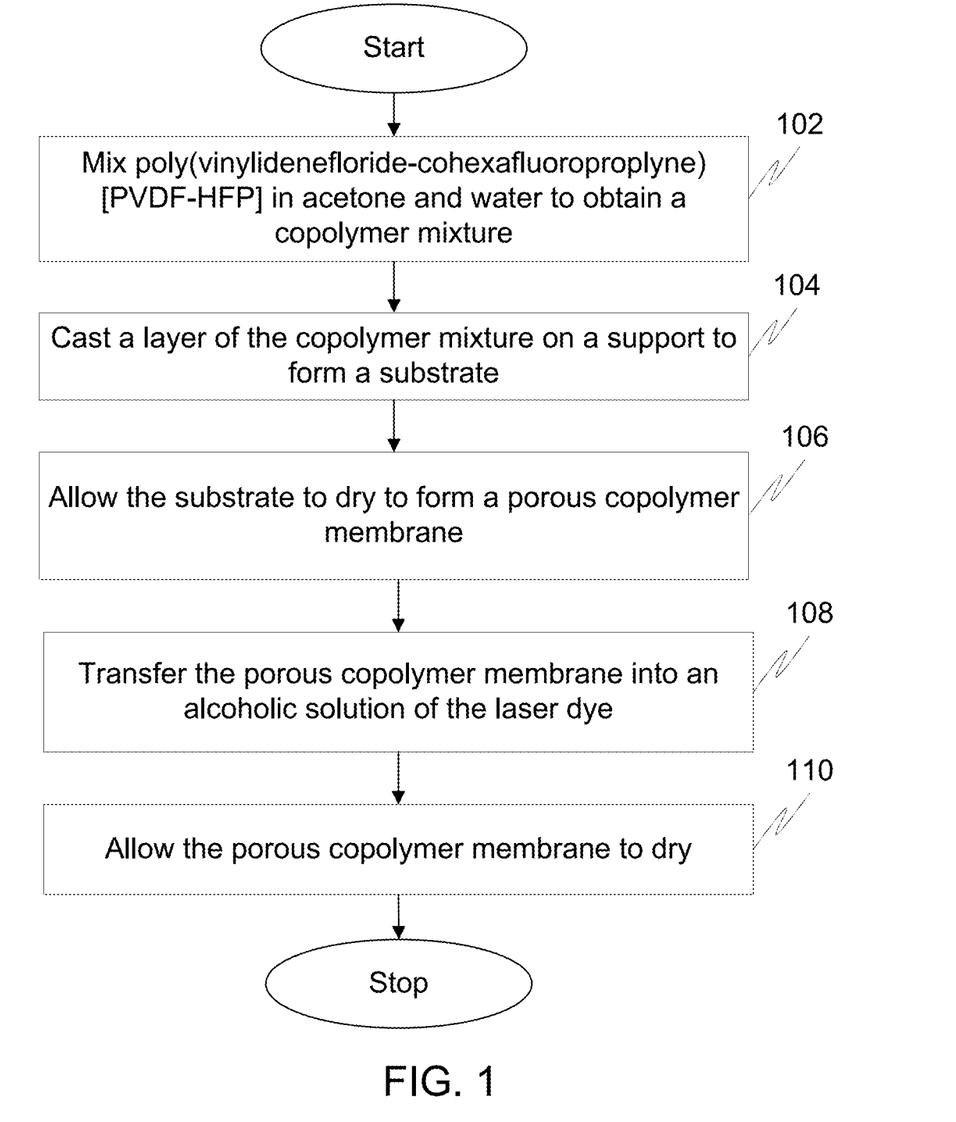
FIG. 1 illustrates a flow diagram of a method for preparing a solid state dye laser using a phase inversion technique in accordance with an embodiment of the invention.

FIG. 1 illustrates a flow diagram of a method for preparing a solid state dye laser using a phase inversion technique in accordance with an embodiment of the invention.

At step 102, PVDF-HFP is mixed in acetone and water to obtain a copolymer mixture.

Moving on, at step 104, a layer of the copolymer mixture is casted on a support to form a substrate. In an embodiment, the layer of the copolymer mixture is casted on the support to form the substrate using a coating technique. For example, the layer of the copolymer mixture is casted on a glass microscope slide to form the substrate using a dip coating technique at a controlled speed of 0.2 centimeter per minute (cm/min).

At step 106, the substrate is allowed to dry to form a porous copolymer membrane. First, the substrate is allowed to dry in ambient conditions. Since acetone is much more volatile than water, acetone evaporates faster than water. The faster evaporation of acetone leads to instantaneous mutual diffusion between a solvent and a non-solvent. Thus, a highly porous polymer matrix is created due to the mutual diffusion between the solvent and the non-solvent. The pore size is tuned by controlling the ratio of acetone to water. Once the porous copolymer membrane is formed, the porous copolymer membrane is dried under vacuum in a desiccator.

Thereafter, at step 108, the porous copolymer membrane is transferred into a reaction vessel containing an alcoholic solution of a laser dye. The laser dye is one of Rhodamine dye and Coumarin. Rhodamine dye in the solid state dye laser is one of, but not limited to, Rhodamine B, Rhodamine 101, Rhodamine 6G, Rhodamine 110 and Rhodamine 19. Coumarin dye in the solid state dye laser is one of, but not limited to, Coumarin 466, Coumarin 47, Coumarin 102, Coumarin 152A, Coumarin 152, Coumarin 151, Coumarin 6H, Coumarin 307, and Coumarin 500. In an embodiment, the alcoholic solution of the laser dye includes organic solvents selected from a group which includes ethanol, benzyl alcohol, cyclohexane, dichloroethane, Dimethyl Sulfoxide (DMSO), dioxane, methanol, and toluene. For example, the alcoholic solution of the laser dye in the reaction vessel is about 1 weight by volume (w/v) to 20 w/v of the ethanolic solution of Rhodamine B dye. In a preferred embodiment, the alcoholic solution of the laser dye is 5% w/v of the ethanolic solution of Rhodamine B dye.

In an embodiment, the porous copolymer membrane is allowed to react with the alcoholic solution of the laser dye at a temperature of about 30 degree Celsius (° C.) for time period of about 8 hours to about 12 hours. However, the porous copolymer membrane is allowed to react with the alcoholic solution of the laser dye at any suitable drying temperature and for any suitable time period. For example, the porous copolymer membrane and the alcoholic solution of the laser dye can be left in the reaction vessel overnight.

Finally, at step 110, the porous copolymer membrane is allowed to dry. Before drying, the porous copolymer membrane incorporated with the laser dye is thoroughly rinsed with the alcoholic solution. The porous copolymer membrane incorporated with the laser dye is dried under vacuum in a desiccator. Thus, the laser dye is homogenously distributed on the porous copolymer membrane.

For a breath figure technique, the steps 102 to 110 are performed in a humid chamber to prepare the solid state dye laser.

Figure 2:
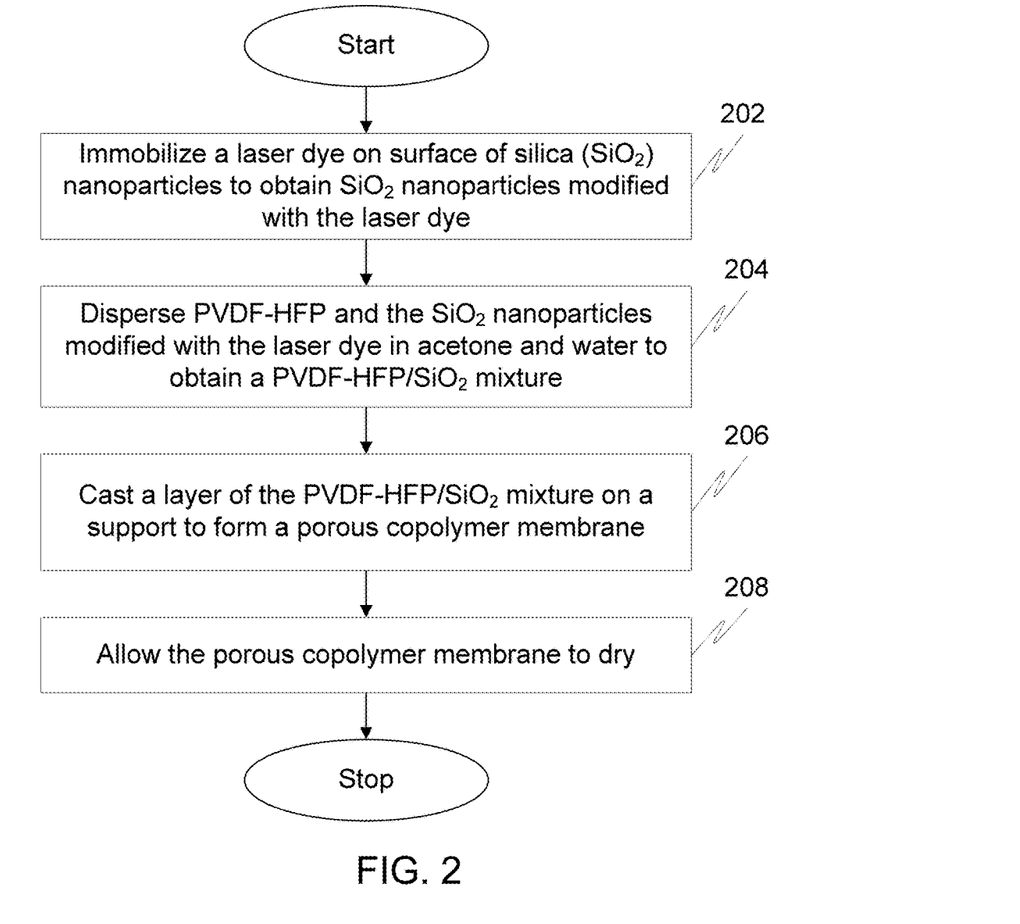
FIG. 2 illustrates a flow diagram of a method for preparing a solid state dye laser using phase separation technique in accordance with an embodiment of the invention.

FIG. 2 illustrates a flow diagram of a method for a solid state dye laser using a phase separation technique in accordance with an embodiment of the invention.

At step 202, a laser dye is immobilized on surface of silica ($SiO_2$) nanoparticles to obtain $SiO_2$ nanoparticles modified with the laser dye. The laser dye is immobilized on the surface of the $SiO_2$ nanoparticles using ester covalent binding. To begin with, the surface of the $SiO_2$ nanoparticles is modified with thiol groups for the ester covalent binding. Thereafter, the $SiO_2$ nanoparticles modified with the thiol groups are treated with the laser dye to form strong interactions via ester covalent bonds. The laser dye is one of Rhodamine dye and Coumarin. Rhodamine dye in the solid state dye laser is one of, but not limited to, Rhodamine B, Rhodamine 101, Rhodamine 6G, Rhodamine 110 and Rhodamine 19. Coumarin dye in the solid state dye laser is one of, but not limited to, Coumarin 466, Coumarin 47, Coumarin 102, Coumarin 152A, Coumarin 152, Coumarin 151, Coumarin 6H, Coumarin 307, and Coumarin 500.

Moving on, at step 204, PVDF-HFP and the $SiO_2$ nanoparticles modified with the laser dye are dispersed in acetone and water to obtain a PVDF-HFP/$SiO_2$ mixture. Step 204 is further described in detail in conjunction with FIG. 3.

Thereafter, at step 206, a layer of the PVDF-HFP/$SiO_2$ mixture is casted on a support to form a porous copolymer membrane. In an embodiment, the layer of the PVDF-HFP/$SiO_2$ mixture is casted on the support to form the substrate using a coating technique. For example, the layer of the PVDF-HFP/$SiO_2$ mixture is casted on a glass microscope slide to form the substrate using a dip coating technique at a controlled speed of 0.2 centimeter per minute (cm/min).

Finally, at step 208, the porous copolymer membrane is allowed to dry. The porous copolymer membrane is allowed to dry in ambient conditions. Since acetone is more volatile than water, acetone starts to evaporate first. The evaporation of the acetone leads to instantaneous mutual diffusion between a solvent and a non-solvent. The mutual diffusion between the solvent and the non-solvent creates a highly porous copolymer matrix impeded with the $SiO_2$ nanoparticles modified with the laser dye. The porous copolymer membrane thus obtained is composed of multiple layers with micron size pores.

For a breath figure technique, the steps 202 to 208 are performed in a humid chamber to prepare the solid state dye laser.

Figure 3:
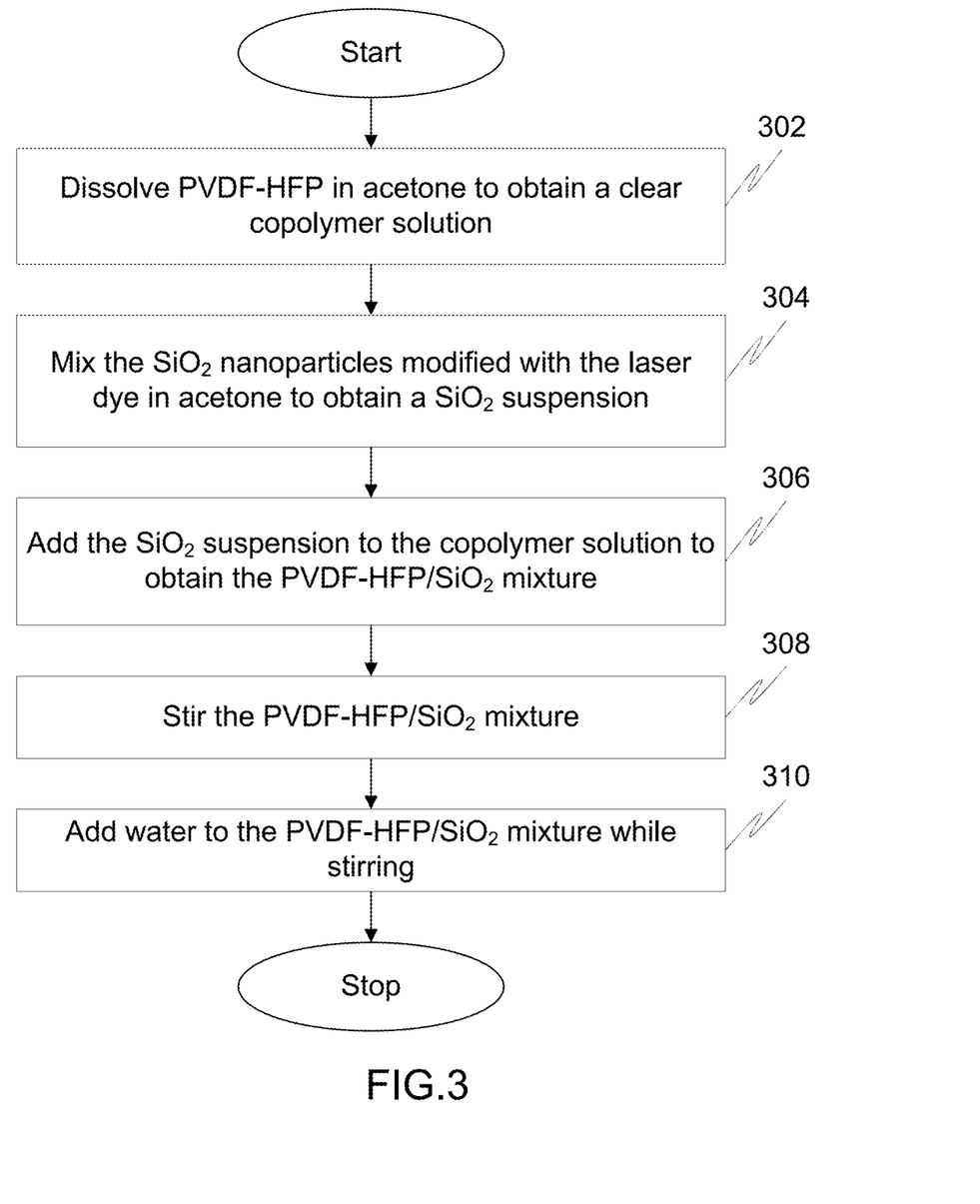
FIG. 3 illustrates a flow diagram of a method of dispersing poly(vinylidenefloride-cohexafluoroproplyne) [PVDF-HFP] and the Silica ($SiO_2$) nanoparticles modified with the laser dye in acetone and water to obtain a PVDF-HFP/$SiO_2$ mixture.

FIG. 3 illustrates a flow chart of a method of dispersing PVDF-HFP and the $SiO_2$ nanoparticles modified with the laser dye in acetone and water to obtain a PVDF-HFP/$SiO_2$ mixture.

At step 302, PVDF-HFP is dissolved in acetone to obtain a clear copolymer solution. Thereafter, PVDF-HFP with acetone is stirred for a time period of about 10 minutes to about 6 hours until a clear polymer solution is obtained.

Moving on, at step 304, the $SiO_2$ nanoparticles modified with the laser dye is mixed in acetone to obtain a $SiO_2$ suspension. For example, a required weight of the $SiO_2$ nanoparticles modified with the laser dye is mixed thoroughly with acetone.

At step 306, the $SiO_2$ suspension is added to the clear copolymer solution to obtain the PVDF-HFP/$SiO_2$ mixture. The amount of acetone used to prepare the PVDF-HFP/$SiO_2$ mixture is controlled to maintain the concentration of PVDF-HFP in the PVDF-HFP/$SiO_2$ mixture less than or equal to 4 weight percentage (wt %).

Thereafter, at step 308, the PVDF-HFP/$SiO_2$ mixture is stirred. In an embodiment, the PVDF-HFP/$SiO_2$ mixture is stirred for a time period of about 10 minutes to about 5 hours to achieve uniform and homogenous dispersion of the $SiO_2$ nanoparticles modified with the laser dye.

Finally, at step 310, water is added to the PVDF-HFP/$SiO_2$ mixture while stirring. The water is added to the PVDF-HFP/$SiO_2$ mixture until the weight ratio of acetone to water in the PVDF-HFP/SiO2 mixture is 1:1. The addition of water to the PVDF-HFP/$SiO_2$ mixture leads to an increase in the viscosity of the PVDF-HFP/$SiO_2$ mixture. If the weight ratio of water to acetone exceeds 1:1, the PVDF-HFP begins to precipitate. After adding water, the PVDF-HFP/$SiO_2$ mixture is stirred thoroughly for a time period of about 1 hour to about 8 hours.

WORKING EXAMPLE 1

Figure 4:
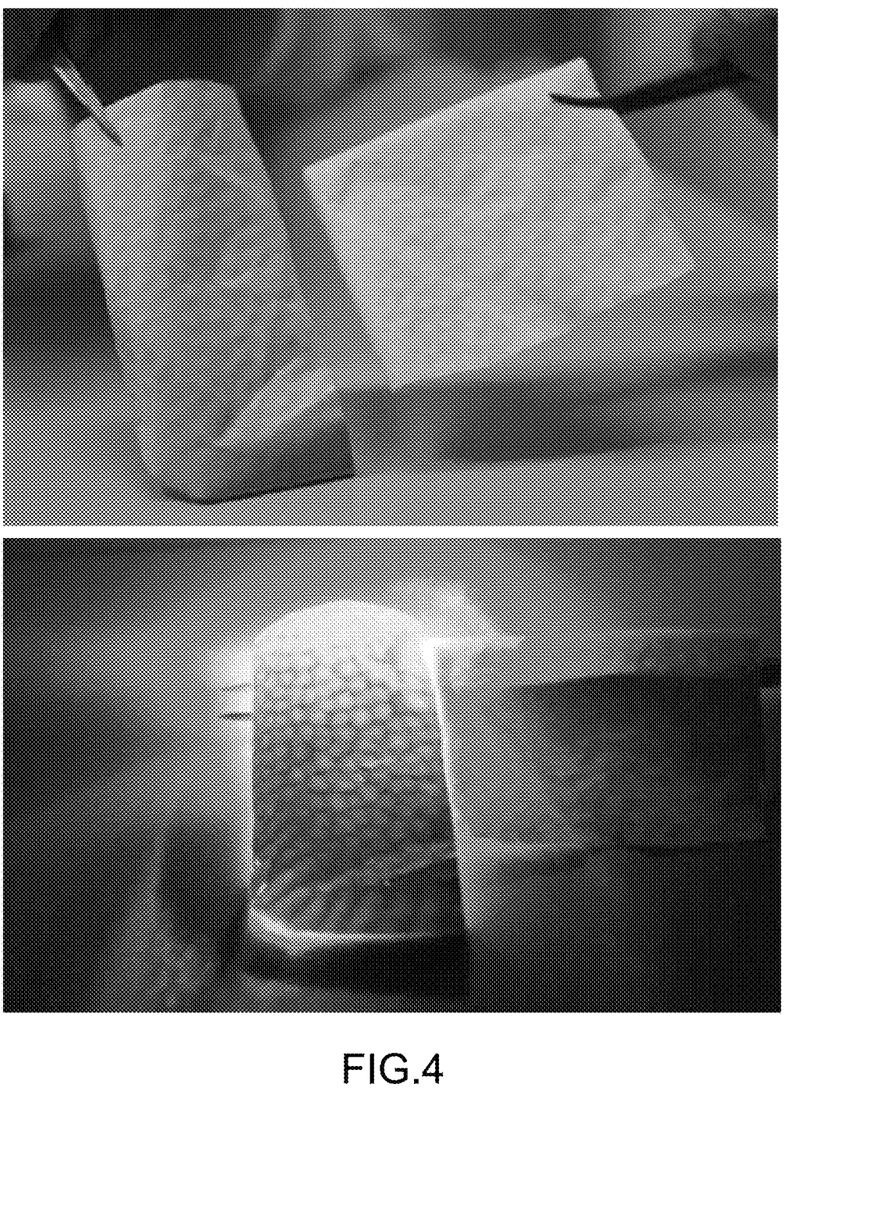
FIG. 4 depicts the effectiveness of Rhodamine B-PVDF-HFP membrane which is measured using a green laser light.

Preparation of a Rhodamine B-poly(vinylidenefluoride-cohexafluoroproplyne [PVDF-HFP] Membrane for a Solid-State Dye Laser Using a Phase Inversion Technique In this working example, a porous PVDF-HFP membrane is prepared and then loaded with Rhodamine B dye. The copolymer solution is prepared using a phase inversion technique by mixing PVDF-HFP in acetone and water. A layer of the copolymer solution is casted on a glass microscope slide by a dip coating technique at a controlled speed of 0.2 cm/min. The substrate is allowed to dry in ambient conditions. The evaporation of the acetone leads to creation of a highly porous copolymer membrane. The pore size is tuned by controlling the ratio of acetone to water. After the porous copolymer membrane is dried under vacuum in a desiccator, the porous copolymer membrane is transferred to a reaction vessel which contains Rhodamine B dye dissolved in 5% w/v ethanol. The reaction is carried out at 30° C. and left overnight to form a Rhodamine B-PVDF-HFP membrane. Subsequently, the Rhodamine B-PVDF-HFP membrane is thoroughly rinsed with ethanol and dried under vacuum in a desiccator. The Rhodamine B-PVDF-HFP membrane shows a homogenous distribution of Rhodamine B in the porous copolymer membrane. FIG. 4 depicts the effectiveness of the Rhodamine B-PVDF-HFP membrane which is measured using a green laser light. Thus, the method of preparing Rhodamine B-PVDF-HFP membrane is confirmed by infrared spectroscopy.

WORKING EXAMPLE 2

Figure 5:
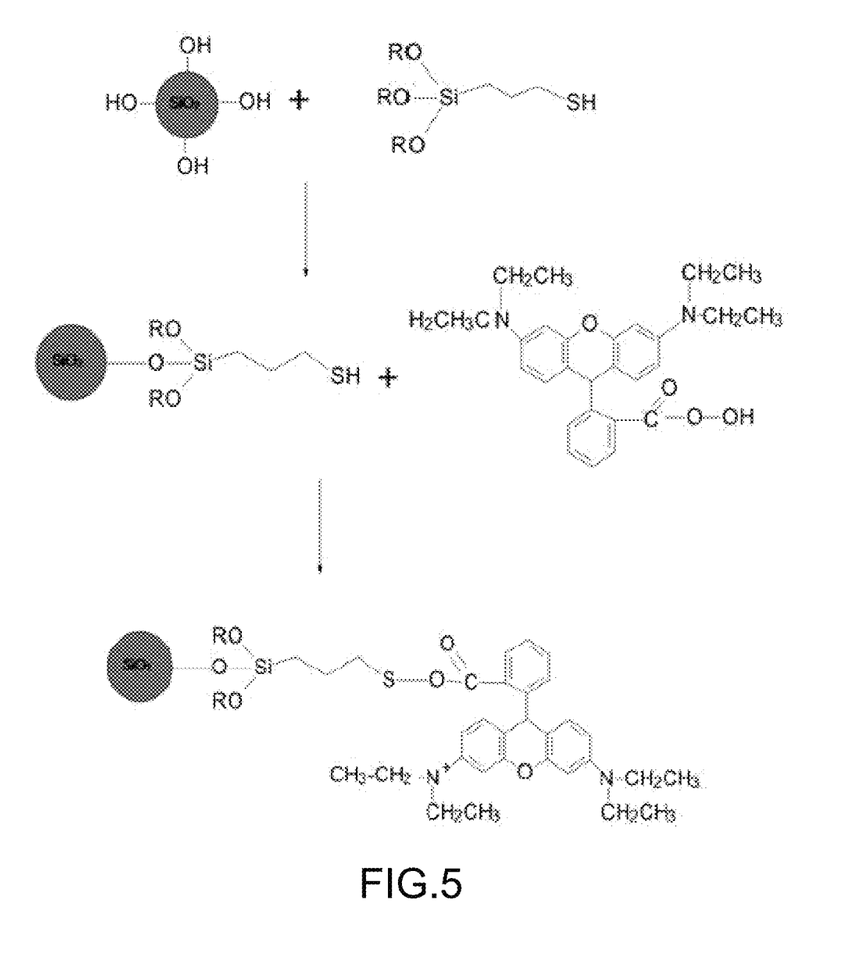
FIG. 5 depicts reactions for preparing $SiO_2$ nanoparticles modified with Rhodamine dye.

Preparation of a Rhodamine B-poly(vinylidenefloride-cohexafluoroproplyne [PVDF-HFP] Membrane for a Solid-State Dye Laser Using a Phase Separation Technique In this working example, Rhodamine B dye is immobilized on the surface of $SiO_2$ nanoparticles via ester covalent binding. The surface of $SiO_2$ nanoparticles were modified with thiol groups and thereafter, treated with Rhodamine B dye to form strong interactions via ester covalent bonds. FIG. 5 depicts reactions for preparing $SiO_2$ nanoparticles modified with Rhodamine dye. The phase separation technique is used to prepare a nano-composite copolymer membrane using a solution containing PVDF-HFP, the $SiO_2$ nanoparticles modified with Rhodamine dye, acetone and water. PVDF-HFP is dissolved in acetone and stirred for 2 hours until a clear copolymer solution is obtained. In a separate container, a required weight of the $SiO_2$ nanoparticles modified with Rhodamine B dye is mixed thoroughly with acetone to obtain the $SiO_2$ suspension. Thereafter, the $SiO_2$ suspension is added to the clear copolymer solution to obtain the PVDF-HFP/$SiO_2$ mixture. The PVDF-HFP/$SiO_2$ mixture is stirred for 4 hours to achieve uniform and homogenous dispersion of the $SiO_2$ nanoparticles modified with Rhodamine B dye. The amount of acetone used to prepare the PVDF-HFP/$SiO_2$ mixture is controlled to produce 2 wt % concentration of PVDF-HFP in the PVDF-HFP/$SiO_2$ mixture. Subsequently, water is added to PVDF-HFP/$SiO_2$ mixture while stirring. The water is added to get weight ratio of water to acetone to 1:1. After adding water, the PVDF-HFP/$SiO_2$ mixture is thoroughly stirred for 6 hours to disperse the $SiO_2$ nanoparticles modified with Rhodamine B dye in the structure of the copolymer membrane. A thin layer of the PVDF-HFP/$SiO_2$ mixture is casted on a glass microscope slide by a dip coating technique at a controlled speed of 0.2 cm/min to form a substrate. The substrate is allowed to dry in ambient conditions. The evaporation of the acetone creates a highly porous polymer matrix impeded with Rhodamine B dye via the $SiO_2$ nanoparticles. The nano-composite copolymer membrane is composed of multi layers with micron size pores.

Stability Test:

The table reports an intensive investigation with data to confirm the stability of attaching the Rhodamine to copolymer membranes of poly(vinylidenefloride-cohexafluoroproplyne [PVDF-HFP].

TABLE

| Washing solution | Rhodamine physically adsorbed on $SiO_2$ nanoparticles | Rhodamine attached to the $SiO_2$ nanoparticles with thiol linker | Rhodamine directly attached to PVDF-HFP copolymer membrane | Rhodamine attached to $SiO_2$ nanoparticles with thiol linkers, both impregnated into PVDF-HFP copolymer membrane |
|---|---|---|---|---|
| Ethanol 100% | Rhodamine completely removed after 4 washing cycles | No Rhodamine removed after 5 washing cycles | No Rhodamine removed after 5 washing cycles | No Rhodamine removed after 5 washing cycles |
| Water 100% | Rhodamine completely removed after 5 washing cycles | No Rhodamine removed after 5 washing cycles | No Rhodamine removed after 5 washing cycles | No Rhodamine removed after 5 washing cycles |
| Water and ethanol | Rhodamine completely removed after 5 washing cycles | No Rhodamine removed after 5 washing cycles | No Rhodamine removed after 5 washing cycles | No Rhodamine removed after 5 washing cycles |

Further, the table also reports stability results of different items after 5 times of washing with washing solutions such as ethanol, water or water/ethanol mixture. The detaching of Rhodamine is monitored by measuring the absorbance spectrum of Rhodamine in the washing solutions. When Rhodamine is physically adsorbed on $SiO_2$ nanoparticles without thiol linkers, the Rhodamine is 100% detached from the surface of the $SiO_2$ nanoparticles after washing with the washing solutions. (Refer to Column 2 of the Table).

When Rhodamine is attached to the $SiO_2$ nanoparticles with thiol linkers (Refer to Column 3 of the Table), none of the Rhodamine is removed even after 5 times of washing with ethanol, water or mixture of water/ethanol. Thus, thiol linkers strengthen the interaction of Rhodamine with the $SiO_2$ nanoparticles.

Further, the same strong interaction is obtained when the Rhodamine is directly attached to the copolymer membranes with and without the $SiO_2$ nanoparticles (Refer to Columns 4 and 5 of the Table).

Various embodiments of the invention provide a solid state dye laser which enables easy handling of a laser dye membrane. The presence of pores in the laser dye membrane increases the optical homogeneity. Further, the presence of $SiO_2$ nanoparticles improves the photo-stability of dye lasers. The laser dye membrane is mechanically very stable and can be shaped to a required size for various target separation applications. The invention also provides a cost effective approach for mass production of laser dye membranes. The pore size of the laser dye membrane is controlled (nano or micro meter) to gain more or less exit of a laser light. The invention eliminates the need of handling unsafe organic solvents for dye lasers. The invention also provides solvent free coherent source of radiation with a wide tuning range.

Various embodiments of the invention can be implemented in wide range of new applications such as, but not limited to, optical sensors, spectrophotometric instruments, and light emitting device.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of preparing a solid state dye laser using one of a phase separation technique and a breath figure technique, the method comprising:
   immobilizing a laser dye on surface of silica ($SiO_2$) nanoparticles to obtain $SiO_2$ nanoparticles modified with the laser dye;
   dispersing PVDF-HFP and the $SiO_2$ nanoparticles modified with the laser dye in acetone and water to obtain a PVDF-HFP/$SiO_2$ mixture;
   casting a layer of the PVDF-HFP/$SiO_2$ mixture on a support to form a porous copolymer membrane; and
   allowing the porous copolymer membrane to dry.

2. The method of claim 1, where in the laser dye is immobilized on the surface of the $SiO_2$ nanoparticles using ester covalent binding, wherein the surface of the $SiO_2$ nanoparticles are modified with thiol groups.

3. The method of claim 1, wherein the dispersing of PVDF-HFP and the $SiO_2$ nanoparticles modified with the laser dye in acetone and water to obtain the PVDF-HFP/$SiO_2$ mixture comprises:
   dissolving PVDF-HFP in acetone to obtain a clear copolymer solution;
   mixing the $SiO_2$ nanoparticles modified with the laser dye in acetone to
   obtain a $SiO_2$ suspension;
   adding the $SiO_2$ suspension to the clear copolymer solution to obtain the PVDF-HFP/$SiO_2$ mixture;
   stirring the PVDF-HFP/$SiO_2$ mixture; and
   adding water to the PVDF-HFP/$SiO_2$ mixture while stirring.

4. The method of claim 3, wherein the PVDF-HFP/$SiO_2$ mixture is stirred for a time period of about 10 minutes to about 6 hours.

5. The method of claim 3, wherein the amount of acetone used to prepare the PVDF-HFP/$SiO_2$ mixture is such that the concentration of PVDF-HFP in the PVDF-HFP/$SiO_2$ mixture is less than or equal to 4 weight percentage (wt %).

6. The method of claim 3, wherein the PVDF-HFP/$SiO_2$ mixture is stirred for a time period of about 10 minutes to about 5 hours.

7. The method of claim 1, wherein the ratio of acetone to water in the PVDF-HFP/$SiO_2$ mixture is 1:1.

8. The method of claim 1 further comprises stirring of the PVDF-HFP/$SiO_2$ mixture for a time period of about 1 hour to about 8 hours after dispersing the PVDF-HFP and the $SiO_2$ nanoparticles modified with the laser dye in acetone and water to obtain the PVDF-HFP/$SiO_2$ mixture.

9. The method of claim 1, wherein casting of the layer of the PVDF-HFP/$SiO_2$ mixture on the support to form the substrate is carried out using a coating technique.

10. The method of claim 1, wherein allowing the porous copolymer membrane to dry occurs in one of ambient conditions and a vacuum desiccator.

* * * * *

UNITED STATES PATENT AND TRADEMARK OFFICE
CERTIFICATE OF CORRECTION

PATENT NO.        : 10,450,441 B2
APPLICATION NO.   : 14/872182
DATED             : October 22, 2019
INVENTOR(S)       : Nezar Hassan Khdary and Mamdouh E. Abdelsalam

Page 1 of 1

It is certified that error appears in the above-identified patent and that said Letters Patent is hereby corrected as shown below:

On the Title Page

In the (72) Inventors section, please delete "Adelaide (AU)" and replace Mamdouh E. Abdelsalam's residence as -- Al-Asha (SA) --.

Signed and Sealed this
Fourteenth Day of January, 2020

Andrei Iancu
*Director of the United States Patent and Trademark Office*